United States Patent
Cappelle et al.

(10) Patent No.: US 9,505,664 B2
(45) Date of Patent: Nov. 29, 2016

(54) INORGANIC NUTRITIVE IRON COMPOSITION

(71) Applicant: PRAYON, Engis (BE)

(72) Inventors: Philippe Jacques Myriam Cappelle, Esneux (BE); Kurt Thierry S. Verhelst, Oud-Turnhout (BE)

(73) Assignee: PRAYON, Engis (BE)

( * ) Notice: Subject to any disclaimer, the term of this patent is extended or adjusted under 35 U.S.C. 154(b) by 0 days.

(21) Appl. No.: 14/434,071

(22) PCT Filed: Sep. 18, 2013

(86) PCT No.: PCT/EP2013/069397
§ 371 (c)(1),
(2) Date: Apr. 7, 2015

(87) PCT Pub. No.: WO2014/056690
PCT Pub. Date: Apr. 17, 2014

(65) Prior Publication Data
US 2015/0251963 A1    Sep. 10, 2015

(30) Foreign Application Priority Data

Oct. 10, 2012 (BE) .................... 2012/0666

(51) Int. Cl.

| C05B 13/06 | (2006.01) |
| C05B 17/00 | (2006.01) |
| C05B 17/02 | (2006.01) |
| C05G 3/00 | (2006.01) |
| A23L 33/16 | (2016.01) |
| A23L 33/165 | (2016.01) |
| A23L 1/304 | (2006.01) |

(52) U.S. Cl.
CPC ............. *C05B 13/06* (2013.01); *A23L 1/304* (2013.01); *A23L 1/3045* (2013.01); *A23L 33/16* (2016.08); *A23L 33/165* (2016.08); *C05B 17/00* (2013.01); *C05B 17/02* (2013.01); *C05G 3/0076* (2013.01)

(58) Field of Classification Search
CPC combination set(s) only.
See application file for complete search history.

(56) References Cited

U.S. PATENT DOCUMENTS

| 3,784,367 | A | 1/1974 | Moore |
| 3,856,500 | A | 12/1974 | Cox |
| 4,333,052 | A | 6/1982 | Chen et al. |
| 4,721,519 | A | 1/1988 | Thomas |
| 5,707,418 | A * | 1/1998 | Hsu ........................... C05B 7/00 71/32 |
| 6,168,643 | B1 * | 1/2001 | Hsu ........................... C05B 7/00 71/32 |
| 6,436,165 | B1 * | 8/2002 | Konzak .................. C05B 15/00 71/33 |
| 7,160,350 | B2 * | 1/2007 | Lovatt ...................... C05B 7/00 71/11 |
| 7,691,171 | B2 * | 4/2010 | Varadachari ............ C05B 13/00 423/306 |
| 2009/0124572 | A1 | 5/2009 | Nelson |
| 2010/0206032 | A1 * | 8/2010 | Varadachari ............ C05B 13/04 71/42 |
| 2010/0240533 | A1 | 9/2010 | Varadachari |
| 2015/0225303 | A1 * | 8/2015 | Subramanyam ......... C05D 9/02 71/27 |

FOREIGN PATENT DOCUMENTS

JP    53-48875    * 5/1978

OTHER PUBLICATIONS

International Search Report (PCT/ISA/210) for PCT/EP2013069397 mailed Nov. 14, 2013.

* cited by examiner

*Primary Examiner* — Wayne Langel
(74) *Attorney, Agent, or Firm* — Koppel, Patrick, Heybl & Philpott

(57) ABSTRACT

The present invention relates to an inorganic liquid nutritive composition comprising at least one aqueous phase, a polyphosphate and at least one source of iron as micronutrient, having a $P_{poly}/Fe_{total}$ molar ratio of between 5 and 50.

11 Claims, No Drawings

INORGANIC NUTRITIVE IRON COMPOSITION

The present invention relates to an inorganic nutrient composition in aqueous phase enriched with micronutrients.

Whether for human or animal nutrition or the nutrition of plants or microorganisms, the uptake of minerals (macro- and micronutrients) is essential for the life cycles of these different organisms. However, so that they can be absorbed and acquired it is indispensable that these nutrient elements should be bioavailable i.e. they can be fully solubilised in a solution from which they can be drawn and taken up by these organisms.

However, iron is a micronutrient well-known to be an element that is particularly difficult to solubilise. One of the routes used to solubilise iron is the complexing thereof with an organic chelate. However organic chelates are becoming increasingly disputed as food additive, like all organic additives, and are therefore no longer suitable for the solubilising of iron in food additives or in any microorganism culture intended to be ingested such as some ferments or microalgae, or in edible plants.

More recently some authors focused on the possibility of complexing iron with polyphosphates such as pyrophosphate, tripolyphosphate or higher phosphate polymers and the present invention comes within this context.

Solid compositions are known from document US 20090124572. This document discloses a solid food supplement containing chelated iron pyrophosphate. According to the teaching of the document, the said solid can be solubilised and chelated using citrate which is an organic source.

The present invention relates more particularly to an inorganic nutrient composition comprising at least one aqueous phase, a polyphosphate and at least one iron source as micronutrient, the said nutrient composition having a $P_{poly}$/Fe molar ratio of between 5 and 50 where $P_{poly}$ represents a total number of moles of phosphorus in the form of polyphosphate and where Fe represents a total number of iron moles.

As previously mentioned, such aqueous phase nutrient compositions find applications in numerous fields as varied as human and animal foods, the culture of microorganisms or horticulture and the derivatives thereof such as hydroponics and fertigation. However, in numerous applications iron is an element which appears to be a perturbing element of a composition's stability when in aqueous phase, scarcely soluble in this aqueous phase and leading to a micronutrient that is often scarcely bioavailable since, depending on the medium in which it is contained, it often generates the onset of precipitates.

This is the case for example for food supplements in suspension form or in the form of effervescent tablets that are unpleasant to swallow.

Similarly, in food supplement applications, such as supplemented liquids (milk, beverages, yoghurt) or any other supplemented food, the medium to which the iron is added does not necessarily have a pH which promotes dissolution of the iron, which may give rise to numerous problems especially regarding consumer acceptance of the food product, consumers not being inclined to ingest a turbid food or a food containing precipitates.

With regard to the plant organisms, while carbon represents the essential nutrient for photosynthesis, mineral elements (macro- and micronutrients) are just as important for optimal plant development. These mineral elements are typically acquired by plants from the soil or culture substrate via absorbent root hairs allowing the absorption of water and minerals.

Amongst these micronutrients iron is the nutrient for which a plant requires the highest concentration (in the order of 100 mg/kg of dry tissue), this mineral being needed for the synthesis of chlorophyll which itself is essential for photosynthesis which in turn is directly related to plant growth.

Iron, unlike the process of human digestion, is very scarcely soluble in aqueous phase and is therefore very scarcely bioavailable for plants not having a gastric acid pH to facilitate the bioavailability or iron. Iron then forms a precipitate which perturbs stabilisation of the solution.

At the present time, numerous cultures (tomatoes, cucumbers, zucchini, lettuce, peppers . . . ) are grown in hydroponic culture or using drip irrigation systems, both these techniques allowing fertigation i.e. providing both hydro- and mineral feed for plants through a nutrient aqueous composition reaching as far as the roots of plants.

However, since these culture techniques are based on the absence of a substrate or on the use of inert substrates (sand, clay beads, rock-wool, . . . ), first they are not aided by the soil's microbial flora which regulates the pH of the soil for more traditional cultures and secondly they do not benefit from the supply of native substances also contained in the soil which could complex the iron making it bioavailable.

In the particular case of hydroponics, the above-mentioned neutral, inert substrates are regularly irrigated with a flow of aqueous liquid supplying mineral salts and nutrients essential for the plants via a pipe network conveying the nutrient aqueous composition.

The drip irrigation system also requires a substrate and hoses to dispense a nutrient aqueous composition to the plants via discontinuous irrigation on the top surface of a substrate.

While these fertilisation modes are widely used and allow a considerable increase in the yields of numerous cultures, one major constraint is that the nutrient elements (macro- and micronutrients) in aqueous solution and conveyed as far as the roots of plants, must be bioavailable i.e. they must be able to be taken up directly by the plants and must therefore be capable of passing from the liquid nutrient solution into the plants via the absorbent root hair system, and must remain in soluble form.

This is why much research has been conducted to develop nutrient compositions in aqueous phase that are inorganic, concentrated or ready-to-use, stable, without impurities having fully dissolved constituents whether these be iron or other nutrient elements, the liquid fertilizing compositions also having to exhibit sufficient buffering capacity.

For example, inorganic, aqueous phase nutrient compositions such as mentioned in the foregoing comprising an aqueous phase, a polyphosphate and iron are disclosed in documents U.S. Pat. No. 3,784,367, U.S. Pat. No. 4,721,519, U.S. Pat. No. 4,336,053.

For example document U.S. Pat. No. 3,784,367 describes fertilizing compositions in aqueous phase of potassium polyphosphate produced from wet process polyphosphoric acid and KCl, the polyphosphoric acid containing iron in complexed form. Once the potassium polyphosphate is obtained, ammonia or ammonium thiosulfate is added so that the fertilizing aqueous phase composition contains ammonium ions ($NH_4^+$) ensuring the presence of nitrogen in the aqueous formulation in a molar ratio $N/P_{total}$ disclosed in the examples of between 0.51 and 0.56.

Unfortunately, said aqueous phase fertilizing composition containing so much nitrogen in the form of $NH_4^+$ ions in a molar ratio $N/P_{total}$ of between 0.51 and 0.56 does not allow a fully liquid nutrient polyvalent composition to be obtained, but only in aqueous phase.

According to this document, the presence of ammonium in such quantity, although not explained, appears to be dictated by the constraints of the process and therefore generates an ammonium content pro rata to the polyphosphate content, which makes polyvalent use impossible of the nutrient composition thus obtained. While in some fields of application the presence of ammonium gives rise to fewer problems, as in the general case of traditional agriculture, in other applications it is not required and/or not necessarily required at the content dictated by the above-described process.

While there exists in the soil a population of nitrifying bacteria which convert ammonium ions to nitrate ions, this is not the case for inert or neutral substrates in soil-less culture, causing an accumulation of ammonium ions which are harmful for plants. For example, tomato, radish and spinach plants ill-withstand the presence of ammonium ions which can even lead to withering of these plants.

Also in soil-less culture, by comparison with soil growing where soil has a natural buffering capacity and also via the population of saprophyte and symbiotic microorganisms, neutral or inert substrates do not have sufficient buffering capacity to overcome the lowering of pH that the uptake of $NH_4^+$ ions causes at root level. The presence of $NH_4^+$ ions therefore perturbs control over pH in this type of culture. In addition the solution used to date to overcome this disadvantage, which entails increasing the pH of the nutrient solution in aqueous phase, cannot be implemented for several major reasons.

First, one of the easy, compatible routes to increase pH is to add an additional amount of ammonia, which would only make the problem worse.

Next, the presence of ammonium ions is incompatible with higher pH values of nutrient solutions since over and above a value of 6.2 there is release of gaseous ammonia. This again translates as lowering of the pH of the nutrient solution which tends to stabilise at around 6.

Finally, the release of gaseous ammonia reaches dangerous levels in terms of explosiveness and noxiousness over and above a pH of 8.5.

Additionally, the process used in document U.S. Pat. No. 3,784,367 based on the obtaining of potassium polyphosphate from wet process polyphosphoric acid, leads to solutions comprising numerous impurities.

These impurities prevent the use of said solutions for hydroponic culture and drip irrigation systems, without being limited thereto, since these impurities are either in solid form or precipitate over time thereby causing gradual accumulation of impurities in the pipes conveying the nutrient aqueous composition and in the dispensing heads, leading to clogging of the fertilizing system. The system which conveys the nutrient aqueous composition then becomes inoperative and must be fully dismounted for cleaning or replacement, thereby no longer ensuring plant nutrition or continued fertigation which is nevertheless the primary purpose of this technique.

Such operations require time, monopolise surface areas which can no longer be used for plant production, with consequences in terms of culture yield and production costs.

To obtain impurity-free aqueous formulations according to the process described in document U.S. Pat. No. 3,784,367 very costly thermal process acid would need to be used, the use of which would give rise to a costly, non-competitive end product compared with existing nutrient aqueous formulations.

An aqueous fertilizing composition is also known from document U.S. Pat. No. 3,856,500 which comprises finely divided potassium polyphosphate in a liquid. The presence of these particles in suspension prevents polyvalent use of the said fertilizing composition e.g. in hydroponic culture without taking into consideration that these particles are highly likely to form seeds for the growth of subsequent precipitates.

There is therefore a true need to provide truly liquid solutions that are ready-to-use and stable (without precipitates or solid impurities) at a competitive price and which can be used for several applications.

For example these polyvalent, stable, liquid solutions can be given direct nutritional use for human and animal foods, for beverages, for plants grown in soil or hydroponic culture, or they may form stock solutions to be diluted in water before use.

The present invention therefore sets out to bring a solution to these problems by providing a polyvalent nutrient composition which is stable and in the form of a solution (and remains a solution) in which the micronutrients are and remain in bioavailable form.

By the terms <<solution, liquid or liquid solution>> in the meaning of the present invention is meant a solution entirely in liquid form i.e. a formulation in which the presence of impurities or solid particles is lower than 0.2% and more preferably lower than 0.05% by weight relative to the total weight of the formulation, even after storage for a predetermined period of time.

For this purpose the invention provides an inorganic nutrient composition such as mentioned in the foregoing, comprising at least one aqueous phase, at least one polyphosphate and at least one source of iron as micronutrient, the said nutrient composition having a molar ratio $P_{poly}$/Fe of between 5 and 50 where $P_{poly}$ represents a total number of moles of phosphorus in polyphosphate form and where Fe represents a total number of moles of iron, which is characterized in that the said inorganic nutrient composition comprising at least one aqueous phase is in the form of an aqueous solution in which the iron of the said iron source is complexed to the said at least one polyphosphate, and in that it also has a molar ratio $N/P_{total}$ of 0.2 or less where N represents the number of moles of ammonium and where $P_{total}$ represents the number of moles of total phosphorus.

The nutrient solution thus obtained is first a mineral composition therefore not containing an organic compound, making the use thereof particularly polyvalent, and secondly it has a flexible, limited nitrogen content and not an ammonium content dictated by the process. In addition, the nutrient composition thus obtained is a solution and hence a liquid formulation thereby providing iron in bioavailable form which remains fully in the liquid state after storage for a minimum period of 6 months.

According to the present invention it has been shown that a said composition in the form of an inorganic nutrient solution comprising at least one polyphosphate and having a molar ratio $N/P_{total}$ of 0.2 or less allows complete dissolution of the iron and of all the constituents of the liquid inorganic nutrient formulation, and hence allows a composition to be obtained in the form of a liquid inorganic nutrient solution in the meaning of the invention.

In addition, the proportion of $P_{poly}$, namely of phosphate in the form of polyphosphates, relative to the iron content, is optimal so that the polyphosphates act as complexing agent and maintain the iron in solution in the form of dissolved ions.

Also, contrary to the liquid composition of document U.S. Pat. No. 3,784,367, the liquid composition of the present invention allows polyvalent use in any type of application such as foodstuffs, plant or microorganism culture, whether soil-grown or soil-less such as hydroponic culture or drip fertigation, whilst bringing a solution to the highly problematic presence of ammonium.

According to the present invention, the nutrient solution has a molar ratio $N/P_{total}$ of 0.2 or less, which may vary according to needs and may even, in some cases, be zero provided the production process of the composition of the present invention does not contain a compulsory step for the addition of ammonia or ammonium.

This reduced ammonium content has several advantages, the chief advantages being indicated below. Regarding culture on neutral or inert substrates, soil-less culture, the reduced content of nitrogen and hence of ammonium prevents the accumulation of ammonium ions which are harmful for a good number of plants.

Additionally, the concentration of ammonium ions is sufficiently low in the nutrient solution so that their absorption by the root system does not perturb control over the pH of the said solution. It is effectively known that the uptake of each $NH_4^+$ ion is accompanied by the release of one $H_3O^+$ ion.

Finally, the reduced ammonium content allows nutrient solutions to be obtained having a pH that is no longer necessarily lower than 6.5, since the problem of ammonia release is bypassed. A pH higher than 6.5 tends significantly to reduce the hydrolysis rate of the constituent P—O—P bonds of the polyphosphates. This hydrolysis reaction leads to progressive retrograding of the polyphosphates to orthophosphates which do not have any complexing property. As a result since it is possible to raise the pH, which reduces degradation of the polyphosphates, this improves the stability of the composition of the invention and guarantees the bioavailability of iron over longer periods.

To conclude the solution of the present invention, by bypassing problems related to the presence of ammonium ions, allows the maintained stability of the nutrient solution and hence allows the micronutrients to be maintained in bioavailable form.

Also the nutrient solution of the present invention, which allows the maintaining of the micronutrients in solubilised and bioavailable form, allows as many applications as desired in that it has a most certain advantage in food applications, but also for any type of plant and/or microorganism culture such as hydroponic or fertigation culture for which the presence of precipitates would be fatal.

Therefore, most advantageously the inorganic nutrient composition in the form of a liquid solution according to the invention is stable and can be given polyvalent use both for <<traditional>> cultures (soil-grown cultures) and for soil-less cultures (e.g. hydroponics or drip irrigation), but also in the sector of food additives and supplements.

In addition, its polyvalent nature simplifies stock management and storage and transport facilities since a single solution is suitable for different areas of application. The solution of the invention which can be marketed in the form of a ready-to-use concentrate or solution, although different solutions can also be envisaged having varied contents or nutrient sources for specialised adaptation to various applications, confirms the perfect flexibility of the nutrient solution according to the present invention.

Advantageously the said molar ratio $P_{poly}/Fe$ is between 8 and 32, this molar ratio of iron content to polyphosphate content allowing the iron to be maintained entirely in solution in the final nutrient solution, despite the presence of other ions such as $Ca^{2+}$ and $Mg^{2+}$ which compete with iron through their own complexing reactions with the polyphosphates, and for a sufficient length of time to ensure the stability of the nutrient solution.

Advantageously, the said molar ratio $N/P_{total}$ is 0.15 or lower, preferably 0.10 or lower, more preferably 0.05 or lower and further preferably close to 0, even zero.

Advantageously the inorganic nutrient solution of the present invention has an iron content of between 0.02 and 3% by weight of iron relative to the total weight of the said nutrient composition, so as to provide a balance between polyphosphate content required for buffering capacity and for micronutrient complexing and the supply of iron needed for the various applications of the solution according to the present invention.

Advantageously the inorganic nutrient solution of the invention further comprises an additional source of micronutrient selected from the group comprising sources of B, Mn, Zn, Cu, Mo, Co and the mixtures thereof, the said at least one additional source of micronutrient being contained in an atomic ratio relative to Fe of between 0.1 and 5 for B, between 0.05 and 2.5 for Mn, between 0.01 and 1 for Zn, between 0.005 and 0.25 for Cu and Mo, and between 0.001 and 0.1 for Co.

Said contents of micronutrients ensure adequate supplies of micronutrients for numerous applications i.e. according to the true needs of organisms. However these contents can be modified in relation to the application (animal, human or plant) and in relation to the stage of plant development for applications to plants which, according to morphology and growth phase, require variable proportions of different macro- and micronutrients.

Preferably, according to the present invention, the said at least one polyphosphate is selected from the group formed by sodium and potassium alkaline polyphosphates which, in addition to acting as iron complexing agents, also contribute towards the supply of essential micronutrients indispensable for man, animal and plants, for which they promote proper growth and metabolism.

Preferably, according to the present invention, the said at least one polyphosphate is selected from the group formed by pyrophosphates and tripolyphosphates such as tetrapotassium pyrophosphate (TKPP), potassium tripolyphosphate (KTPP), sodium tripolyphosphate (STPP), sodium acid pyrophosphate (SAPP) and tetrasodium pyrophosphate.

In the present invention it has been shown that these polyphosphates are particularly indicated since first they act as complexing agents thereby allowing the iron to be maintained in the form of dissolved ions which can be taken up by organisms, and secondly they are well tolerated or deemed acceptable as nutrient food additives or for cultures. Also, as mentioned above, these polyphosphates contribute towards supplies of phosphorus, sodium and potassium, three elements required for proper development of organisms.

Advantageously, in the nutrient solution of the present invention the molar ratio $M/P_{total}$ is between 1 and 2, preferably between 1.3 and 2 and where M represents the total number of moles of sodium and potassium alkaline metal.

Advantageously, the nutrient solution of the present invention further comprises phosphorus in the form of orthophosphate in a molar ratio $P_{ortho}/P_{total}$ of between 0 and 0.95, where $P_{ortho}$ represents the number of moles of phosphorus in orthophosphate form and where $P_{total}$ represents the number of total phosphorus moles, this molar ratio preferably being between 0 and 0.3. The phosphate source according to the present invention in one advantageous embodiment also allows a supply of phosphorus (P) in the form of phosphates able to be taken up by and useful for organisms.

According to the present invention, most advantageously the inorganic nutrient solution displays solution turbidity lower than 50 NTU preferably lower than 20 NTU, and contains a percentage of insolubles of less than 0.2% by weight relative to the weight of the composition, preferably less than 0.1% by weight relative to the weight of the composition.

In addition, just as advantageously the nutrient solution of the present invention has a storage time of more than 6 months, preferably longer than 12 months at 25° C.

In one particularly preferred embodiment, and in particularly unexpected manner, the nutrient solution of the present invention has a pH in the range of 7.0 to 10.8.

This pH range is fully surprising for the nutrient solution of the invention since, as indicated in the foregoing, persons skilled in the art would not envisage such a range for two major reasons. The first reason lies in the fact as mentioned above that this pH range accelerates the release rate of gaseous ammonia, if present, even at low contents thereof as in the present invention. This accelerated release of ammonia leads to toxicity and hazard risks considered to be unacceptable.

The second reason, well known to persons skilled in the art, lies in the fact that the precipitation and complexing of iron (II or III) by the OH⁻ ions increasingly competes with iron complexing by the polyphosphate anions as and when the pH of the solution is increased. It was therefore most surprisingly found that the inorganic nutrient solution of the present invention is able to be obtained and maintained stable in the pH range of 7 and 10.8 which amounts to an additional technological advantage in that, typically at acid pH values, the hydrolysis of polyphosphates to orthophosphates is accelerated. The fact that it is possible to maintain a nutrient solution at a pH between 7 and 10.8 therefore makes it possible to reduce hydrolysis of the polyphosphates and hence to increase the lifetime of the nutrient solution.

The hydrolysis of the polyphosphates to lower phosphates finally leading to the formation of orthophosphates would result in a gradual reduction in polyphosphate content and hence of the $P_{poly}$/Fe molar ratio of the nutrient solution, which would undeniably reduce the bioavailability of iron in the final nutrient medium in which the complexing of other ions such as calcium and magnesium by the polyphosphates competes with the complexing of iron. In addition, this hydrolysis could also cause a phenomenon of post-precipitation in the nutrient solution itself through the reduction of this $P_{poly}$/Fe molar ratio.

Advantageously, the inorganic nutrient composition of the invention has a transmittance value measured by UV-visible absorption spectrophotometry at a wavelength of 254 nm and optical path length of 10 mm, of at least 45%, preferably at least 55%, more preferably at least 65% and further preferably at least 75%.

In greenhouse horticulture it is advantageous to recycle drainage waters in the fertigation system so that residual salts are not discharged into the environment. The propagation of microorganisms may lead to the onset of bacteria, viruses, moulds or nematodes. These organisms can be harmful for plants. Disinfection of drainage waters therefore becomes an advantageous operation to prevent propagation of the said microorganisms. At the current time, the recycling of drainage waters is obtained by exposing the collected solution to ultraviolet radiation (UV-C), preferably at a wavelength of 254 nm to achieve sufficient destruction of the genetic material of the said micro-organisms.

Therefore a drainage solution which is sufficiently permeable to UV-C radiation is advantageous since radiation will be able to reach the microorganisms without being absorbed by the solutes in the said solution. The solutions containing the composition of the invention absorb less UV-C radiation than solutions containing organic chelates.

Also, the composition of the invention better withstands UV-C radiation compared with a nutrient composition comprising an organic chelating agent which undergoes irreversible photochemical decomposition. This translates as better stability of the composition of the invention during UV-C treatment, thereby preventing in particularly advantageous manner any loss of iron via precipitation.

Other embodiments of the composition of the invention are indicated in the appended claims.

The invention also relates to the use of an inorganic nutrient composition of the invention to produce a dilute solution in which the macronutrients and micronutrients are bioavailable.

Advantageously, the nutrient composition of the invention in the form of a solution is also used as fertilizing composition for horticulture, fertigation, hydroponics and the like.

In one variant of the invention, the nutrient solution is also used as food supplement or food additive for foods and/or beverages enriched with bioavailable iron. Advantageously, the inorganic nutrient composition of the invention can also be used for animal or human nutrition.

Other embodiments of use according to the invention are indicated in the appended claims.

Other characteristics, details and advantages of the invention will become apparent from the non-limiting examples below, given with reference to the appended examples.

According to the present invention, an iron-based inorganic nutrient solution is obtained by contacting an aqueous phase, an iron source and a phosphate source containing at least one polyphosphate, as described in the examples.

As indicated previously, the phosphate source added to the aqueous phase is taken from the group formed by sodium and potassium alkaline polyphosphates, and preferably from the group of pyrophosphates and tripolyphosphates such as tetrapotassium pyrophosphate (TKPP), potassium tripolyphosphate (KTPP), sodium tripolyphosphate (STPP), sodium acid pyrophosphate (SAPP) and tetrasodium pyrophosphate (TSPP), this not excluding the presence of polyphosphate chains of longer length although in the present invention it has been shown that the polyphosphates with 2 or 3 P atoms are particularly indicated to ensure bioavailability of the iron in numerous life applications.

The said at least one iron source is selected from the group formed by $Fe_2(SO_4)_3 \cdot xH_2O$ where x is a molar coefficient of between 0 and 9, $MFe(SO_4)_2 \cdot 12H_2O$ where M is Na or K, $Fe(NO_3)_3 \cdot xH_2O$ where x is a molar coefficient between 0 and 9, $FeCl_3 \cdot xH_2O$ where x is a molar coefficient between 0 and 6, $Fe_4(P_2O_7)_3$, $FePa_4 \cdot xH_2O$ where x is a molar coefficient between 0 and 4, $FeSO_4 \cdot xH_2O$ where x is a molar coefficient between 0 and 7, $FeCl_2 \cdot xH_2O$ where x is a molar coefficient between 0 and 4, $FeO \cdot xH_2O$ where x is a molar coefficient between 0 and 1, $Fe(NH_4)PO_4 \cdot H_2O$, iron oxysulfate, $Fe_2O_3 \cdot xH_2O$ where x is a molar coefficient between 0 and 3, and the mixtures thereof.

When an additional source of micronutrient is added as source of B, Mn, Zn, Cu, Mo, Co, it is selected from the group formed by $Zn(NH_3)_4SO_4$, $ZnCl_2$, $Zn(NO_3)_2.xH_2O$ where x is a molar coefficient between 0 and 3, zinc oxysulfate having a total weight fraction of zinc in the range of 20 to 60% relative to the weight of the compound, $ZnSO_4.xH_2O$ where x is a molar coefficient between 0 and 7, $Cu(OH)_2$, $CuCl$, $CuCl_2$, $3Cu(OH)_2.CuCl_2$, $CuSO_4.xH_2O$ where x is a molar coefficient between 0 and 5, $Cu(NH_4)PO_4.H2O$, $MnCl_2.xH_2O$ where x is a molar coefficient between 0 and 4, manganese oxysulfate having a total weight fraction of manganese in the range of 30 to 50% relative to the weight of the compound, $MnSO_4.xH_2O$ where x is a molar coefficient between 0 and 5, $(NH_4)_6Mo_7O_{24}.4H_2O$, $H_2MoO_4.H_2O$, $Na_2MoO_4.2H_2O$, $H_3BO_3$, $Na_2B_{10}O_{16}.10H_2O$, $Na_2B_4O_7$, $Na_2B_4O_7.5H_2O$, $Na_2B_4O_7.10H_2O$, $Na_2B_8O_{13}.4H_2O$, $CoCl_2.6H_2O$, $Co(NO_3)_2.6H_2O$, and the mixtures thereof.

On reading the examples below, the advantages of the invention will be evidenced in relation to the different nutrient compositions produced in solution form, both with regard to the solubility of the iron and the stability of these nutrient solutions.

EXAMPLES

Example 1

First, 100 g of TKPP (42.7 weight % of $P_2O_5$, 57.0 weight % of $K_2O$) were dissolved in 99.5 g of water. After complete dissolution of the polyphosphate, 15.5 g of ferric sulfate powder were added (21.9 weight % of Fe). Dissolution of the iron was obtained under agitation at ambient temperature. 17.7 g of 23.8 weight % KOH solution were added 1 day after the iron source and the solution was finally filtered after 1 additional day of agitation. The solution then reached a pH of 9.6 with an iron concentration of 1.48 weight %, $P_2O_5$ concentration of 18.8 weight % and $P_{poly}$/Fe molar ratio of 10.0. The solution was still limpid after a storage time of 4 months at 5° C. during which the pH measured at 20° C. had risen to 10.0.

Comparative Example 1

Procedure was the same as in Example 1 with the exception of the weight of 23.8% KOH which this time was 23.0 g and the agitation time before the addition of KOH was only 30 minutes. The freshly filtered solution had a pH of 11.6. It exhibited major precipitate after a storage time of 4 months at 5° C., which imparted turbidity of 220 NTU. The pH at 20° C. was 11.0.

Example 2

First 100 g of TKPP (42.7 weight % of $P_2O_5$, 57.0 weight % of $K_2O$) were dissolved in 99.4 g of water. After complete dissolution of the polyphosphate, 31.3 g of a 27.6 weight % solution of $H_3PO_4$ were initially added, followed by 15.4 g of powder ferric sulfate (21.9 weight % of Fe). The solution was filtered after agitation for 1 day at ambient temperature. The solution then reached a pH of 7.1 with an iron concentration of 1.30 weight %, a $P_2O_{5total}$ concentration of 19.4% and $P_{poly}$/Fe molar ratio of 10.0. It was still limpid after a storage time of 4 months at 5° C.

Example 3

The same procedure was followed as in Example 2 with the exception of the weight of 27.6% $H_3PO_4$ which this time was 115.3 g. The pH after filtering was 5.1. The final iron concentration was 1.06 weight %. This solution was also limpid after a storage time of 4 months at 5° C.

Example 4

Initially 51.5 g of KTPP (46.4 weight % $P_2O_5$, 53.3 weight % $K_2O$) were dissolved in 66.0 g of water. After complete dissolution of the polyphosphate, first 5.96 g of $FeCl_2.4H_2O$ (28.0 weight % Fe) were added in powder form followed by 1.87 g of KOH solution at 23.8 weight %. The solution which became limpid after an agitation time of 10 minutes at ambient temperature was not filtered. Its pH was 9.0 with a $P_{poly}$/Fe molar ratio of 10.0 and weight concentrations of 1.35% for iron, 19.6 for $P_2O_{5total}$ and 2.3% for $P_2O5_{ortho}$. The solution was still limpid after a storage time of 4 months at 5° C.

Example 5

Initially 50.0 g of KTPP (46.4 weight % $P_2O_5$, 53.3 weight % $K_2O$) were dissolved in 66.0 g of water. After complete dissolution of the polyphosphate, first 11.8 g of 27.6 weight % $H_3PO_4$ solution 27.6 were added followed by 7.61 g of powder ferric sulfate (21.9 weight % of Fe). The solution was filtered after agitation for 1 day at ambient temperature. The solution then reached a pH of 6.7 with an iron concentration of 1.34 weight %, concentration of $P_2O5_{total}$ of 19.8% and $P_{poly}$/Fe molar ratio of 10.0. It was still limpid after a storage time of 4 months at 5° C.

Example 6

Initially 100.0 g of KTPP (46.4 weight % $P_2O_5$, 53.3 weight % $K_2O$) were dissolved in 116.8 g of water. After complete dissolution of the polyphosphate, first 69.1 g of 27.6 weight % $H_3PO_4$ solution were added followed by 15.3 of powder ferric sulfate (21.9 weight % of Fe). The solution was filtered after agitation for 1 day at ambient temperature. The solution then reached a pH of 5.1 with an iron concentration of 1.06 weight %, a concentration of $P_2O_{5total}$ of 19.9% and $P_{poly}$/Fe molar ratio of 10.0. It was still limpid after a storage time of 4 months at 5° C.

Example 7

The solutions of the six preceding examples and of the comparative example were subjected to accelerated ageing tests at 60° C. to evaluate their respective hydrolysis rates. The manner in which temperature accelerates the hydrolysis reaction is well described in the literature (Phosphorus and its Compounds, J. Van Wazer, Interscience Publishers (1958), Vol. 1, p. 452). The effect of pH is similar, irrespective of ageing temperature.

The results are given in Table 1.

The conversion rate CR is defined as the molar ratio $P_{poly}/P_{total}$ where $P_{poly}$ is the number of phosphorus moles in polyphosphate form and $P_{total}$ is the number of moles of total phosphorus in the nutrient solution. The total phosphorus content can be easily determined in the nutrient solution of the present invention and allows the calculation of the total number of phosphorus moles in the nutrient solution. The number of moles of orthophosphate can also be easily determined which, by subtraction, allows the calculation of the number of moles of phosphorus in polyphosphate form $P_{poly}=P_{total}-P_{ortho}$.

TABLE 1

| Example | 1 | Comp. Ex1 | 2 | 3 | 4 | 5 | 6 |
|---|---|---|---|---|---|---|---|
| Polyphosphate type | TKPP | TKPP | TKPP | TKPP | KTPP | KTPP | KTPP |
| Before ageing: | | | | | | | |
| pH | 10.0 | 11.0 | 7.3 | 5.2 | 9.0 | 6.8 | 5.1 |
| Turbidity (NTU) | 1.7 | 220 | 0.6 | 0.5 | 1.3 | 1.4 | 0.5 |
| Conversion rate (%) | >99.5 | >99.5 | 81.3 | 63.6 | 84.0 | 73.2 | 57.8 |
| After ageing 20 days at 60° C.: | | | | | | | |
| pH | 9.5 | 9.5 | 6.9 | 5.3 | 7.6 | 6.4 | 5.2 |
| Turbidity (NTU) | 1.7 | 249 | 0.6 | >1000[1] | 1.4 | 1.5 | >1000[1] |
| Conversion rate (%) | 97.1 | 97.6 | 41.7 | 8.4 | 50.8 | 26.5 | 17.2 |
| MR ($P_{poly}$/Fe) | 9.7 | 9.8 | 5.1 | 1.3 | 6.4 | 3.6 | 3.0 |

[1] = the solution gelled

Example 8

Culture tests were conducted on cucumber plants of <<Proloog>> variety in a greenhouse of size 140 m² equipped with heating, climate control and culture systems usually used for commercial crops. The culture system was composed of steel trays hanging 50 cm above the ground with a distance of 80 cm between rows. The trays comprised rockwool mattresses 15 cm×7.5 cm and were encased in polyethylene film with bottom drainage slots. In the present example the drainage waters were not recycled in the fertigation circuit.

The cucumber plants of <<Proloog>> variety were supplied on 10 cm blocks of rockwool. These blocks were planted in the rockwool mattress as soon as the plants reached a height of 30 cm. Planting density was 1.4 plants/m².

Table 2 illustrates the standard composition of the nutrient solution used in this example to reach optimal concentrations at the root medium. This root medium is characterized in particular by a very low content of ammonium ions ($NH_4^+$). The titration of ammonium ions in irrigation water is a crucial point for horticulturists. In particular they use this parameter to regulate the pH of the root medium.

TABLE 2

|  | Nutrient solution | Target values for the root medium |
|---|---|---|
| Electrical conductivity (mS/cm) | 2.5-3.5 | 2.70 |
| pH | 5.0-5.6 | 5-5 |
| $NH_4$ (mM) | 1.7 | 0.1 |
| K (mM) | 10.8 | 8 |
| Ca (mM) | 5.4 | 6.5 |
| Mg (mM) | 1.9 | 3.0 |
| $NO_3$ (mM) | 21.6 | 18 |
| $SO_4$ (mM) | 1.9 | 3.5 |
| P (mM) | 1.7 | 1.25 |
| Fe (M) | 15 | 25 |
| Mn (μM) | 10 | 7.0 |
| Zn (μM) | 5.0 | 7.0 |
| B (μM) | 35 | 50 |
| Cu (μM) | 0.8 | 1.5 |
| Mo (μM) | 0.5 | 1.0 |

This example allowed the comparison between an iron source according to the invention and a standard organic iron chelate, these two different tests each occupying one half of the greenhouse surface area in random distribution.

The iron composition of the invention was the composition in Example 5. The quantities of phosphorus and potassium supplied by this solution were drawn from the standard mother liquor.

The two dilute nutrient solutions were prepared in 500 liter tanks in which the iron was also titrated.

These solutions were continuously held within a pH range of between 5.0 and 5.6. Any necessary corrections were made through the addition of $HNO_3$ or $K_2CO_3$. The electrical conductivity was modulated within a range of 2.5 to 3.5 mS/cm depending on the growth rate of the plants and the climate conditions provided.

Statistical analysis was performed using the Anova method to compare the production yields obtained with the two different sources of iron. The production yields are expressed in kg/m², number of fruits/m² and grams/cucumber. This analysis revealed that the bioavailability of the iron contained in the nutrient composition of the invention is equivalent to that of standard organic iron chelate. This observation was also confirmed by evaluations of degree of ferric chlorosis based on leaf colour.

The complexing effect of the polyphosphate on the iron allows a nutrient composition to be provided having a performance level at least equivalent to that of nutrient compositions containing iron chelated by an organic element.

Example 9

The nutrient composition described in Example 5 and a solution of organic iron chelate frequently used in fertigation on a substrate were diluted to reach an iron concentration of 50 μM and adjusted to a pH of 5.8.

The compositions thus diluted and pH-adjusted were analysed by UV-visible absorption spectrophotometry (apparatus: Shimazu, type: UV-2600 IVDD) at a wavelength of 254 nm over an optical path of 10 mm.

The transmittance value for the diluted nutrient composition of the invention was 72% whilst this value was 38% for the solution prepared with the control organic chelate.

It can therefore be ascertained that the composition of the invention offers permeability to UV-C radiation which is advantageous compared with that observed with the solution containing the organic chelate. This could translate as significant savings in terms of investment (size of UV sterilizer) and energy consumption (power of UV lamp).

Example 10

The complete nutrient solutions of Example 8 were subjected to identical UV-C treatment at 254 nm in a laboratory system with 5 W UV-lamp. The iron content of the two starting solutions adjusted to pH 5.8 was solely in soluble form. The iron contents in solution after UV-C treatment were determined by filtering each solution at 0.22 μm, then measuring the iron concentration of the filtrate by atomic absorption and finally dividing the result by the total iron concentration.

After a given UV-C exposure time, the iron content in solution was 83% for the nutrient solution prepared with the nutrient composition of the invention and 31% for the solution prepared with the standard iron chelate.

The nutrient composition of the invention therefore better resists UV-C radiation than the standard iron chelate in which the organic chelating agent undergoes irreversible photochemical degradation.

The present invention is evidently in no way limited to the above-described embodiments, and numerous modifications can be made thereto without departing from the scope of the appended claims.

The invention claimed is:

1. An inorganic nutrient composition comprising at least one aqueous phase, at least one polyphosphate selected from the group consisting of sodium and potassium alkaline polyphosphates and at least one source of iron as micronutrient, wherein said nutrient composition has a $P_{poly}/Fe$ molar ratio of between 8 and 32 where $P_{poly}$ is a total number of moles of phosphorus in polyphosphate form and where Fe is a total number of moles of iron, wherein said inorganic nutrient composition comprising at least one aqueous phase is in the form of an aqueous solution in which the iron of the said iron source is complexed to the said at least one polyphosphate, and wherein the composition also has a molar ratio $N/P_{total}$ of 0.2 or lower, where N is the number of moles of ammonium and where $P_{total}$ is the number of moles of total phosphorus and an iron content of between 0.02% and 3% by weight relative to a total weight of said nutrient composition.

2. The inorganic nutrient composition according to claim 1 wherein the said molar ratio $N/P_{total}$ is 0.15 or lower.

3. The inorganic nutrient composition according to claim 1 further comprising an additional source of micronutrient selected from the group consisting of sources of B, Mn, Zn, Cu, Mo, Co and the mixtures thereof, and wherein the said at least one additional source of micronutrient is contained in an atomic ratio relative to Fe of between 0.1 and 5 for B, between 0.05 and 2.5 for Mn, between 0.01 and 1 for Zn, between 0.005 and 0.25 for Cu and Mo, and between 0.001 and 0.1 for Co.

4. The inorganic nutrient composition according to claim 1 wherein the said at least one polyphosphate is selected from the group consisting of pyrophosphates and tripolyphosphates.

5. The inorganic nutrient composition according to claim 1 having a molar ratio $M/P_{total}$ between 1 and 2, and where M is the total number of moles of sodium and potassium alkaline metal.

6. The inorganic nutrient composition according to claim 1 further comprising phosphorus in orthophosphate form in a molar ratio $P_{ortho}/P_{total}$ of between 0 and 0.95, where $P_{ortho}$ is the number of phosphorus moles in orthophosphate form and where $P_{total}$ is the number of moles of total phosphorus.

7. The inorganic nutrient composition according to claim 1 having solution turbidity lower than 50 NTU, and a percentage of insolubles of less than 0.2% by weight relative to the weight of the composition.

8. The inorganic nutrient composition according to claim 1 having a storage time of more than 6 months at 25° C.

9. The inorganic nutrient composition according to claim 1, having a pH in the range of 7.0 to 10.8.

10. The inorganic nutrient composition according to claim 1 having a transmittance value, measured by UV-visible absorption spectrophotometry at a wavelength of 254 nm and optical path length of 10 mm, of at least 45.

11. The inorganic nutrient composition according to claim 1, wherein the said at least one polyphosphate is selected from the group consisting of tetrapotassium pyrophosphate (TKPP), potassium tripolyphosphate (KTPP), sodium tripolyphosphate (STPP), sodium acid pyrophosphate (SAPP) and tetrasodium pyrophosphate (TSPP).

* * * * *